(12) United States Patent

Merz

(10) Patent No.: US 12,597,043 B2

(45) Date of Patent: Apr. 7, 2026

(54) SYSTEMS AND METHODS FOR MERGING NETWORKS OF HETEROGENEOUS DATA

(71) Applicant: MASTERCARD INTERNATIONAL INCORPORATED, Purchase, NY (US)

(72) Inventor: Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/486,847

(22) Filed: Oct. 13, 2023

(65) Prior Publication Data

US 2024/0112204 A1 Apr. 4, 2024

Related U.S. Application Data

(63) Continuation of application No. 15/209,970, filed on Jul. 14, 2016, now abandoned.

(Continued)

(51) Int. Cl.
*G06Q 30/02* (2023.01)
*G06Q 30/0251* (2023.01)
(Continued)

(52) U.S. Cl.
CPC ......... *G06Q 30/02* (2013.01); *G06Q 30/0255* (2013.01); *G06Q 30/0631* (2013.01); *G06Q 40/063* (2025.08)

(58) Field of Classification Search
None
See application file for complete search history.

(56) References Cited

U.S. PATENT DOCUMENTS 5,025,138 A 6/1991 Cuervo
6,249,755 B1 * 6/2001 Yemini ............... G06F 11/2257
702/183

(Continued)

FOREIGN PATENT DOCUMENTS

CA 3117642 A1 * 11/2021 ............. G06Q 40/03
JP 2008282098 A 11/2008

(Continued)

OTHER PUBLICATIONS

Title: Building a big data analytics service framework for mobile advertising and marketing Authors: Lei Deng et al. Published: 2015 IEEE Frist International Conference on big data computing service and application Date: Mar. 1, 2015 (Year: 2015).*

(Continued)

*Primary Examiner* — Bennett M Sigmond
*Assistant Examiner* — Yongsik Park
(74) *Attorney, Agent, or Firm* — Armstrong Teasdale LLP

(57) ABSTRACT

A method and system for merging heterogeneous data types are provided. The method includes receiving a first corpus of first data, the first data includes an indicator of an interaction between a first element of the first corpus of first data and a second element of the first corpus of first data, receiving a second corpus of second data, the second data includes an indication of an interaction between a third element of the second corpus of second data and a fourth element of the second corpus of data, and generating a third matrix using correlations of the first and second elements with correlations of the third and fourth elements.

20 Claims, 10 Drawing Sheets

Related U.S. Application Data

(60) Provisional application No. 62/192,460, filed on Jul. 14, 2015.

(51) Int. Cl.
G06Q 30/0601 (2023.01)
*G06Q 40/06* (2012.01)

(56) References Cited

U.S. PATENT DOCUMENTS

| | | | |
|---|---|---|---|
| 6,327,574 B1 | 12/2001 | Kramer et al. | |
| 6,505,168 B1 | 1/2003 | Rothman et al. | |
| 6,738,761 B1 * | 5/2004 | Oura | G06Q 10/10 |
| 6,782,370 B1 | 8/2004 | Stack | |
| 6,801,909 B2 | 10/2004 | Delgado et al. | |
| 6,842,737 B1 | 1/2005 | Stiles et al. | |
| 7,181,438 B1 | 2/2007 | Szabo | |
| 7,197,474 B1 * | 3/2007 | Kitts | G06Q 30/02 |
| | | | 705/7.31 |
| 7,269,568 B2 | 9/2007 | Stiles et al. | |
| 7,391,781 B2 * | 6/2008 | Payne | G06Q 10/08 |
| | | | 370/396 |
| 7,546,254 B2 | 6/2009 | Bednarek | |
| 7,685,232 B2 * | 3/2010 | Gibbs | G06F 16/435 |
| | | | 709/201 |
| 7,792,697 B2 | 9/2010 | Bhagchandani et al. | |
| 7,848,950 B2 | 12/2010 | Herman et al. | |
| 7,925,540 B1 | 4/2011 | Orttung et al. | |
| 7,958,066 B2 | 6/2011 | Pinckney et al. | |
| 7,966,282 B2 | 6/2011 | Pinckney et al. | |
| 8,005,832 B2 | 8/2011 | Andrieu | |
| 8,032,480 B2 | 10/2011 | Pinckney et al. | |
| 8,032,481 B2 | 10/2011 | Pinckney et al. | |
| 8,180,702 B2 | 5/2012 | Debow | |
| 8,185,487 B2 | 5/2012 | Tuzhilin et al. | |
| 8,190,478 B2 | 5/2012 | Herman et al. | |
| 8,204,784 B2 | 6/2012 | Bhagchandani et al. | |
| 8,255,263 B2 | 8/2012 | Smallwood | |
| 8,341,006 B2 * | 12/2012 | Lin | G06Q 30/06 |
| | | | 703/2 |
| 8,364,559 B1 | 1/2013 | Bhosle et al. | |
| 8,374,936 B2 | 2/2013 | Fuentes-Torres | |
| 8,458,016 B1 | 6/2013 | Medina, III et al. | |
| 8,484,142 B2 | 7/2013 | Pinckney et al. | |
| 8,489,497 B1 | 7/2013 | Novak et al. | |
| 8,494,978 B2 | 7/2013 | Pinckney et al. | |
| 8,572,020 B2 | 10/2013 | Tuzhilin et al. | |
| 8,583,511 B2 | 11/2013 | Hendrickson | |
| 8,619,984 B2 * | 12/2013 | McSherry | H04K 1/02 |
| | | | 380/252 |
| 8,666,909 B2 | 3/2014 | Pinckney et al. | |
| 8,694,456 B2 | 4/2014 | Grigg et al. | |
| 8,719,085 B2 | 5/2014 | Sullivan | |
| 8,738,486 B2 | 5/2014 | McGeehan | |
| 8,744,961 B2 * | 6/2014 | Allen | G06Q 20/403 |
| | | | 705/40 |
| 8,751,427 B1 | 6/2014 | Mysen et al. | |
| 9,009,088 B2 * | 4/2015 | Wilson | G06Q 30/0631 |
| | | | 706/15 |
| 9,009,096 B2 * | 4/2015 | Pinckney | G06F 16/9535 |
| | | | 706/52 |
| 9,069,934 B1 | 6/2015 | Meeboer | |
| 9,659,310 B1 | 5/2017 | Allen et al. | |
| 9,805,389 B2 * | 10/2017 | Radziwonczyk-Syta | |
| | | | H04L 65/60 |
| 9,858,616 B2 * | 1/2018 | Greene | G06Q 30/0251 |
| 10,438,269 B2 | 10/2019 | Merz et al. | |
| 10,489,789 B1 * | 11/2019 | Gerling-Ospina | H04L 67/55 |
| 10,977,707 B2 * | 4/2021 | Kumaresan Nair | |
| | | | G06Q 30/0631 |
| 12,086,856 B2 * | 9/2024 | Kumaresan Nair | |
| | | | G06Q 30/0625 |
| 2001/0039519 A1 * | 11/2001 | Richards | G06Q 30/0206 |
| | | | 705/26.7 |

| | | | |
|---|---|---|---|
| 2002/0091535 A1 | 7/2002 | Kendall et al. | |
| 2002/0147619 A1 | 10/2002 | Floss et al. | |
| 2002/0161664 A1 | 10/2002 | Shaya et al. | |
| 2002/0166060 A1 | 11/2002 | Hsieh et al. | |
| 2003/0009368 A1 | 1/2003 | Kitts | |
| 2003/0037041 A1 | 2/2003 | Hertz | |
| 2003/0216960 A1 | 11/2003 | Postrel | |
| 2004/0225509 A1 | 11/2004 | Andre | |
| 2005/0251440 A1 | 11/2005 | Bednarek | |
| 2006/0043164 A1 | 3/2006 | Dowling et al. | |
| 2006/0143072 A1 | 6/2006 | Herman et al. | |
| 2006/0259364 A1 | 11/2006 | Strock et al. | |
| 2007/0038515 A1 | 2/2007 | Postrel | |
| 2007/0100773 A1 | 5/2007 | Wallach | |
| 2007/0143172 A1 | 6/2007 | Bhagchandani et al. | |
| 2007/0244741 A1 | 10/2007 | Blume et al. | |
| 2008/0040201 A1 | 2/2008 | Hedlund et al. | |
| 2008/0167887 A1 | 7/2008 | Marcken | |
| 2008/0201271 A1 | 8/2008 | Davis et al. | |
| 2008/0243531 A1 | 10/2008 | Hyder et al. | |
| 2008/0249987 A1 | 10/2008 | Ogasawara | |
| 2009/0048884 A1 | 2/2009 | Olives et al. | |
| 2009/0063304 A1 | 3/2009 | Meggs | |
| 2009/0125498 A1 | 5/2009 | Cao et al. | |
| 2009/0171759 A1 * | 7/2009 | McGeehan | G06Q 40/00 |
| | | | 705/35 |
| 2009/0182568 A1 | 7/2009 | Cordeiro | |
| 2009/0192875 A1 | 7/2009 | Bene et al. | |
| 2009/0192876 A1 | 7/2009 | De et al. | |
| 2009/0198557 A1 | 8/2009 | Wang et al. | |
| 2009/0254463 A1 | 10/2009 | Tomchek et al. | |
| 2009/0254971 A1 | 10/2009 | Herz et al. | |
| 2009/0271246 A1 | 10/2009 | Alvarez et al. | |
| 2009/0281875 A1 | 11/2009 | Tarka | |
| 2009/0307060 A1 | 12/2009 | Merz et al. | |
| 2009/0319423 A1 | 12/2009 | Kersenbrock | |
| 2010/0023374 A1 | 1/2010 | Berwitz et al. | |
| 2010/0211458 A1 | 8/2010 | Ramer et al. | |
| 2010/0256982 A1 | 10/2010 | Bhagchandani et al. | |
| 2010/0280880 A1 | 11/2010 | Faith et al. | |
| 2010/0301114 A1 | 12/2010 | Lo Faro et al. | |
| 2010/0312724 A1 | 12/2010 | Pinckney et al. | |
| 2011/0022606 A1 | 1/2011 | Mason | |
| 2011/0035279 A1 | 2/2011 | Herman et al. | |
| 2011/0066507 A1 | 3/2011 | Iyer et al. | |
| 2011/0068170 A1 | 3/2011 | Lehman | |
| 2011/0077951 A1 | 3/2011 | Tullis | |
| 2011/0078010 A1 | 3/2011 | Postrel | |
| 2011/0078021 A1 | 3/2011 | Tullis | |
| 2011/0093324 A1 | 4/2011 | Fordyce, III et al. | |
| 2011/0246537 A1 * | 10/2011 | Labbi | G06F 16/904 |
| | | | 707/805 |
| 2011/0307478 A1 | 12/2011 | Pinckney et al. | |
| 2012/0109749 A1 | 5/2012 | Subramanian et al. | |
| 2012/0123674 A1 | 5/2012 | Perks et al. | |
| 2012/0226551 A1 | 9/2012 | Bhagchandani et al. | |
| 2012/0232968 A1 | 9/2012 | Calman et al. | |
| 2012/0245991 A1 | 9/2012 | Herman et al. | |
| 2012/0253998 A1 * | 10/2012 | Toyama | G06Q 90/00 |
| | | | 705/30 |
| 2012/0271717 A1 | 10/2012 | Postrel | |
| 2012/0296724 A1 | 11/2012 | Faro et al. | |
| 2012/0303569 A1 | 11/2012 | Tuzhilin et al. | |
| 2012/0303676 A1 | 11/2012 | Tuzhilin et al. | |
| 2012/0324059 A1 | 12/2012 | Tuzhilin et al. | |
| 2013/0024313 A1 | 1/2013 | Dayal et al. | |
| 2013/0030925 A1 | 1/2013 | Calman et al. | |
| 2013/0046626 A1 | 2/2013 | Grigg et al. | |
| 2013/0075469 A1 | 3/2013 | Stochita | |
| 2013/0085804 A1 | 4/2013 | Leff et al. | |
| 2013/0124263 A1 | 5/2013 | Amaro et al. | |
| 2013/0124449 A1 | 5/2013 | Pinckney et al. | |
| 2013/0132283 A1 | 5/2013 | Hayhow et al. | |
| 2013/0179246 A1 | 7/2013 | Ross | |
| 2013/0246125 A1 | 9/2013 | DiGioacchino et al. | |
| 2013/0246146 A1 * | 9/2013 | Fischer | G06Q 30/0222 |
| | | | 705/14.23 |
| 2013/0246176 A1 | 9/2013 | Chang et al. | |
| 2013/0246178 A1 | 9/2013 | Fischer et al. | |

(56) References Cited

U.S. PATENT DOCUMENTS

| | | | |
|---|---|---|---|
| 2013/0264385 A1 | 10/2013 | Stoudt et al. | |
| 2013/0275181 A1 | 10/2013 | DiGioacchino et al. | |
| 2013/0275417 A1 | 10/2013 | Fernandes | |
| 2013/0304691 A1 | 11/2013 | Pinckney et al. | |
| 2013/0346152 A1* | 12/2013 | Rahman | G06Q 30/02 |
| | | | 705/7.31 |
| 2013/0346221 A1 | 12/2013 | Rangachari et al. | |
| 2014/0067596 A1 | 3/2014 | McGovern et al. | |
| 2014/0108320 A1 | 4/2014 | Baca et al. | |
| 2014/0122228 A1* | 5/2014 | Wical | G06Q 30/02 |
| | | | 705/14.53 |
| 2014/0129372 A1 | 5/2014 | Kalnsay | |
| 2014/0164057 A1 | 6/2014 | Wen et al. | |
| 2014/0180979 A1 | 6/2014 | Pinckney et al. | |
| 2014/0207673 A1* | 7/2014 | Jeffries | G06Q 20/405 |
| | | | 705/43 |
| 2014/0297457 A1* | 10/2014 | Sapugay | G06Q 30/0631 |
| | | | 705/26.7 |
| 2014/0297458 A1* | 10/2014 | Sapugay | G06Q 30/0631 |
| | | | 705/26.7 |
| 2014/0372338 A1 | 12/2014 | Kim et al. | |
| 2015/0032602 A1 | 1/2015 | Blackhurst et al. | |
| 2015/0066632 A1 | 3/2015 | Gonzalez et al. | |
| 2015/0066691 A1 | 3/2015 | Ready et al. | |
| 2015/0066721 A1* | 3/2015 | Mandelli | G06Q 40/04 |
| | | | 705/35 |
| 2015/0331866 A1 | 11/2015 | Shen et al. | |
| 2015/0379609 A1* | 12/2015 | Sedhain | G06Q 30/0631 |
| | | | 705/26.7 |
| 2016/0232527 A1* | 8/2016 | Patterson | G06Q 20/405 |
| 2017/0061452 A1* | 3/2017 | Mukherjee | G06Q 10/087 |
| 2018/0130062 A1* | 5/2018 | O'Donnell | G06Q 20/20 |
| 2019/0114645 A1* | 4/2019 | Gaitanos | G06Q 20/4012 |
| 2025/0061503 A1* | 2/2025 | Nair | G06Q 30/08 |

FOREIGN PATENT DOCUMENTS

| | | | |
|---|---|---|---|
| JP | 2012079268 A | 4/2012 | |
| KR | 20100044394 A | 4/2010 | |
| KR | 20120076477 A | 7/2012 | |
| WO | 2012119122 A1 | 9/2012 | |

OTHER PUBLICATIONS

Andrew S. Tanenbaum et al., "Distributed Systems: Principles and Paradigms (2nd Edition)", Pearson Prentice Hall, XP055164378, Isbn: 978-0-13-239227-3, Oct. 12, 2006, 87 pages.

European Extended Search Report, Application No. 12789273.5, dated Sep. 12, 2014, 9 pages.

European Extended Search Report, Application No. 13878016.8, dated Jun. 29, 2016, 9 pages.

European Office Action, Application No. 12789273.5, dated May 8, 2015, 9 pages.

Jan-Keno Janssen, "Wo bist'n du?—Google Geodienst Latitude", c't Mar. 2011, Jan. 17, 2011, XP055205403, retrieved from the Internet: URL: http://www.heise.de/artikel-archiv/ct/2011/03/086/@00250@/ct.11.03.086-088.pdf [retrieved on Jul. 30, 2015], pp. 86-88.

Joab Jackson, "Startup draws restaurant recommendations by analyzing credit card transactions", Computerworld, Accessed via https://www.computerworld.com/article/2507284/ startup-draws-restaurant-recommendations-by-analyzing-credit-card-transactions. html, Mar. 25, 2011, 3 pages.

Liwei Liu et al., "Multi-Criteria Service Recommendation Based on User Criteria Preferences", In RecSys '11, Proceedings of the fifth ACM conference on Recommender systems, 2011, pp. 77-84.

PCT International Search Report and Written Opinion, Application No. PCT/US2012/038515, dated Aug. 3, 2012, 12 pages.

PCT International Search Report and Written Opinion, Application No. PCT/US2013/077843, dated Apr. 21, 2014, 12 pages.

PCT International Search Report and Written Opinion, Application No. PCT/US2016/042219, dated Nov. 1, 2016, 8 pages.

Wikipedia, "Location-based service", Internet Article, XP055187300, retrieved from the Internet: URL:http://en.wikipedia.org/w/index.php?title=Location-based_service&oldid=429423127 [retrieved on May 4, 2015], May 16, 2011.

Wikipedia: "GUI widget", Internet Article, XP055102475, retrieved from the Internet: URL:http://en.wikipedia.org/w/index. php?title=GUI_widget&oldid=418442999 [retrieved on Feb. 17, 2014], Mar. 12, 2011.

Wikipedia: "Interbank network", Internet Article, XP055135992, retrieved from the Internet: URL:http://en.wikipedia.org/w/index.php?title=Interbank network&oldid=514221461 [retrieved on Aug. 22, 2014], Feb. 16, 2011.

Wikipedia: "Mobile Web", Internet Article, XP055265611, retrieved from the Internet: URL:https://en.wikipedia.org/w/index.php?title=Mobile_Web&oldid=429782573 [retrieved on Apr. 14, 2016], May 18, 2011.

Yehuda Koren, et al., "Matrix Factorization Techniques for Recommender Systems", IEEE Computer Society, Aug. 7, 2009, pp. 42-49.

Philip S. Yu, "Data Mining and Personalization Technologies", Proceedings. 6th International Conference on Advanced Systems for Advanced Applications, Jan. 1, 1999, pp. 6-13.

* cited by examiner

600

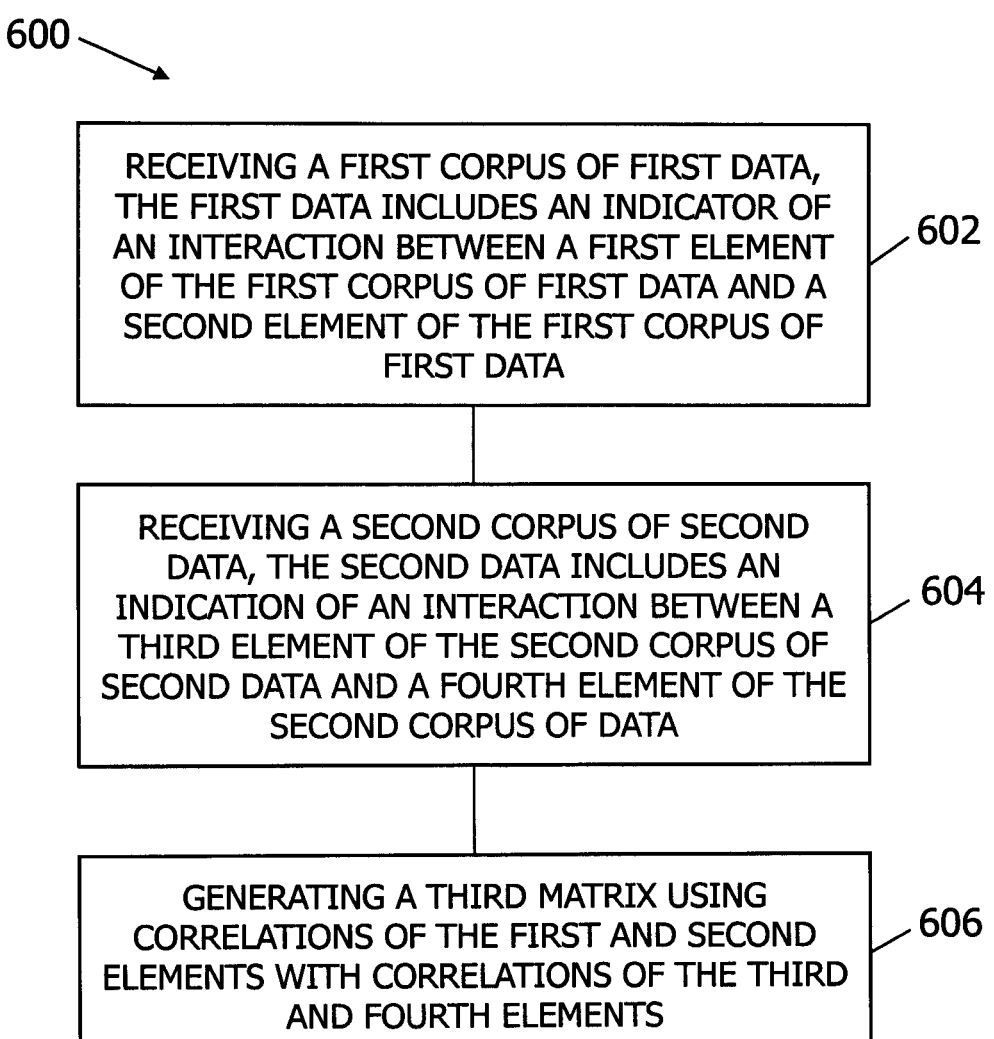

RECEIVING A FIRST CORPUS OF FIRST DATA, THE FIRST DATA INCLUDES AN INDICATOR OF AN INTERACTION BETWEEN A FIRST ELEMENT OF THE FIRST CORPUS OF FIRST DATA AND A SECOND ELEMENT OF THE FIRST CORPUS OF FIRST DATA — 602

RECEIVING A SECOND CORPUS OF SECOND DATA, THE SECOND DATA INCLUDES AN INDICATION OF AN INTERACTION BETWEEN A THIRD ELEMENT OF THE SECOND CORPUS OF SECOND DATA AND A FOURTH ELEMENT OF THE SECOND CORPUS OF DATA — 604

GENERATING A THIRD MATRIX USING CORRELATIONS OF THE FIRST AND SECOND ELEMENTS WITH CORRELATIONS OF THE THIRD AND FOURTH ELEMENTS — 606

FIG. 6

SYSTEMS AND METHODS FOR MERGING NETWORKS OF HETEROGENEOUS DATA

CROSS REFERENCE TO RELATED APPLICATIONS

This application is a continuation of and claims priority to U.S. application Ser. No. 15/209,970 filed on Jul. 14, 2016, which claims priority to and the benefit of the filing date of U.S. Provisional Application No. 62/192,460 filed on Jul. 14, 2015, each of which are hereby incorporated by reference in their entirety.

BACKGROUND

This disclosure relates generally to information networks and, more particularly, to maintaining anonymity of data when merging heterogeneous data from networks.

At least some known recommender systems use historical data to determine preferences of a user, which are then applied to new data to discern potential information in the new data that is of interest to the user. For example, by monitoring financial transaction data from financial transactions of a payment card cardholder, a pattern of cardholder preferences is able to be generated. For example, if a cardholder makes frequent purchases at outdoor oriented department stores and fewer purchases at book stores, an inference may be made about the preferences of recreational activities favored by the cardholder. The recommender system would tend to provide other outdoor oriented stores to the cardholder when queried in for example, a new location.

However, providing recommendations for alternate products or services, or sources of products or services are limited to recommending products at the same retailer.

BRIEF DESCRIPTION

In one embodiment, a method of merging heterogeneous data types includes receiving a first corpus of first data wherein the first data includes an indicator of an interaction between a first element of the first corpus of first data and a second element of the first corpus of first data. The method also includes generating a first matrix that correlates the interactions between the first element and the second element. The method further includes receiving a second corpus of second data wherein the second data includes an indication of an interaction between a third element of the second corpus of second data and a fourth element of the second corpus of data. The method also includes generating a second matrix that correlates the interactions between the third element and the fourth element, and generating a third matrix by merging the first matrix and the second matrix using a key.

In yet another embodiment, a behavioral prediction recommender system includes a first matrix generator configured to generate a first matrix of merchant locations. The first matrix generator is configured to interface with a payment card network to receive financial transaction data for a plurality of cardholders conducting transactions at a plurality of merchants. The system also includes a second matrix generator configured to generate a second matrix of product data. The second matrix generator is configured to receive product data from one or more merchants. The system further includes a matrix calculator configured to combine the first matrix and the second matrix to generate a third matrix and a list generator configured to generate weighted lists of recommended products and merchants and to transmit the lists to at least one of a cardholder and a customer.

In still another embodiment, one or more non-transitory computer-readable storage media has computer-executable instructions embodied thereon, wherein when executed by at least one processor, the computer-executable instructions cause the processor to receive a first corpus of first data that includes an indicator of an interaction between a first element of the first corpus of first data and a second element of the first corpus of first data. The computer-executable instructions further cause the processor to receive a second corpus of second data that includes an indication of an interaction between a third element of the second corpus of second data and a fourth element of the second corpus of data. The computer-executable instructions also cause the processor to generate a third matrix using correlations of the first and second elements with correlations of the third and fourth elements and transmit a structured resultant data element including a recommendation for at least one of the first, second, third and fourth elements to an entity requesting the recommendation.

BRIEF DESCRIPTION OF THE DRAWINGS

FIGS. 1-9 show example embodiments of the methods and systems described herein.

FIG. 1 is a schematic diagram illustrating an example multi-party payment card network system having a behavioral prediction recommender system.

FIG. 2 is a simplified block diagram of the payment card network system including a plurality of computer devices including the behavioral prediction recommender system.

FIG. 4 illustrates an example configuration of a user system operated by a user, such as the cardholder shown in FIG. 1.

FIG. 5 illustrates an example configuration of a server system such as the server system shown in FIGS. 2 and 3A.

FIG. 6 is flow chart of an example method of merging heterogeneous data types that may be used with the behavioral prediction recommender system shown in FIG. 1.

FIG. 7 is a diagram of a correspondence matrix generated by the behavioral prediction recommender system shown in FIG. 1 in an example embodiment of the present disclosure.

FIG. 8 is a schematic block diagram of the behavioral prediction recommender system shown in FIG. 1 in accordance with an example embodiment of the present disclosure.

FIG. 9 is a data flow diagram of behavioral prediction recommender system in accordance with an example embodiment of the present disclosure.

DETAILED DESCRIPTION

Figure 1:
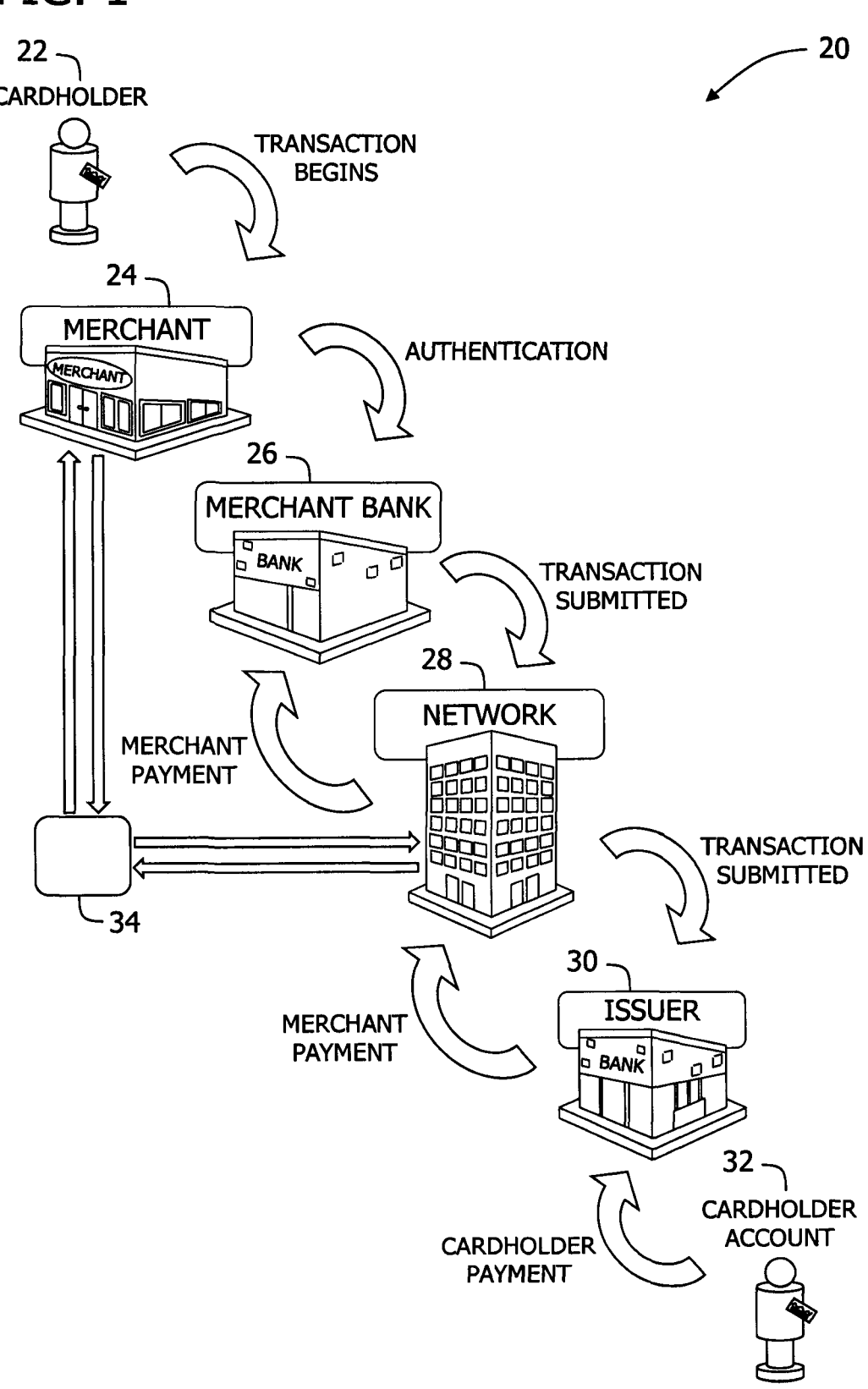

Embodiments of the behavioral prediction recommender system described herein enable a merchant to upload and merge product-level (e.g., SKU, hotel property, etc.) data associated with payment card transaction data, without divulging the product details, to enable personalization of recommendations for customers of the merchant. The behavioral prediction recommender system determines a cardholder's purchasing behavior using the cardholder's own financial transaction data and financial transaction data from other cardholder's to predict other merchants the cardholder would be interested in patronizing. This is useful when the cardholder travels to new locations and is unfamiliar with the merchants in the location traveled to. In addition, other cardholders' experiences may also be captured in the matrix generated from the financial transaction data of the other cardholders. The behavior of the cardholder and the other cardholder influences the results of the behavioral prediction recommender system, such that the behavioral prediction recommender system can predict merchants likely to satisfy the cardholder's requirements. Moreover, with additional information, the prediction can be extended to product recommendations a well. In various embodiments, the process is compliant with Data Usage Guidelines for both opt-in and non-opt-in cardholder scenarios. As used herein, data usage guidelines refer to rules committed to avoid use of data that is personally identifiable either directly or indirectly and that may include different levels of privacy for different levels of permissions. For example, a cardholder or merchant that wishes more accurate predicted recommendation results may opt-in to different levels of approval for use of their data.

In an embodiment, payment card transaction data is received from, for example, a payment card network server and organized into a data structure, such as, but not limited to a two-dimensional (2D) matrix having merchant locations across each axis. Payment card transactions related to each pair of merchants making up a cell of the matrix are tallied in a matrix calculator, such that, a degree of interaction between the two merchant locations can be determined. As used herein, tallying may refer to simple incrementing or decrementing the contents of a matrix cell, or may refer to more complex determinations of the contents of a cell of the matrix, such as, but not limited to polynomial expressions, and the like. Also, as used herein, a degree of interaction relates to the use of a payment card at each of the two merchants or other contact with either of the two merchants. For example, signing up to a merchant's email list, providing a review of the merchant's product or service, or the like is a form of interaction that may be tallied to determine a degree of interaction relating to merchants or products. The use of the payment card at each merchant is another form of interaction that is tallied in the cell of the 2D matrix associated with the two merchants or two products. A greater tally in the associated cell indicates a greater interaction. Additionally, the degree of interaction may be lessened by certain activities. For example, a negative experience at a merchant could decrement a tally associated with a merchant. In one embodiment, the results of forming the matrix may be displayed in a node and edge graph where nodes are merchant locations and edges connect the merchant locations that are related by a number of interactions. The number of interactions between merchant locations is displayed as different size connections, for example, a thicker arrow connecting related merchant locations may represent more interactions than merchant locations having only a few interactions. Similarly, color may be used to indicate the degree of connectivity between related merchant locations.

Using the matrix, a merchant location the customer is likely to patronize may be determined based on a customer's patronizing of another location of a merchant.

Similarly, product data from one of the merchant locations can be organized in a second matrix generator into a second matrix using product level data from the merchant. For example, the product level data is used to tally interactions between products. The tallied interactions could indicate that a customer purchasing a tent is also likely to purchase other camping equipment based on a significant number of interactions between tent product data and for example, camp stove product data. Based on the tally of interactions between each product data cell in the second matrix to each other product data cell in the second matrix, a recommender system, using the second matrix, can determine which pairings of product data are most likely to show which products will be purchased with each other product.

Further, the first and second matrices are combined in a matrix calculator into a third matrix using a key common to each of the first and second matrix, such as, but, not limited to, one or more elements of financial transaction data relating to each interaction to provide further recommendations. A recommender system based on the third matrix is used to show recommendations beyond only other products purchased as is shown using the second matrix or only other merchant locations where purchases were made as is shown using the first matrix. A recommender system based on the third matrix can determine a ranking of interactions not only between merchant locations and between product data, but between product data at different merchant locations as well. For example, using the third matrix, a ranking of recommended products can be for more than one store. Using the example above, a purchase of a tent at one merchant location may be shown to be more closely related to a purchase of a camp stove at a different location than a purchase of a camp stove at the same merchant location. Such a ranking of recommended products is useful for a merchant to display if the different merchant location is a partner merchant. In contrast to the multi-party payment card system, in a closed loop private label payment card system, issuers are directly connected to their partner merchants to process private label transactions using a proprietary network. In the private label payment card system, the private label transactions received by issuers must originate at the known locations of participating partner merchants. For example, an authorization request must be initiated from a partner merchant because partner merchants are the only merchants permitted to be connected to private label network. Issuers transmit authorization responses to merchants using the private label network.

Once the matrices are generated, transaction information may be added by updating in near real-time at least one of individual cells, individual columns, and individual rows of the third matrix based on transactions occurring within a predetermined time. As used herein, real-time refers to updating at least one of individual cells, individual columns, and individual rows of the third matrix within a substantially short period after receiving new financial transaction data, for example, receiving financial transaction data and updating individual cells, individual columns, and/or individual rows of the first and/or second matrix. Real-time or near real-time does refers to updates occurring without substantial intentional delay.

As used herein, the terms "transaction card," "financial transaction card," and "payment card" refer to any suitable transaction card or value transfer device, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of AT&T located in New York, New York). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The following detailed description illustrates embodiments of the disclosure by way of example and not by way of limitation. It is contemplated that the disclosure has general application to processing financial transaction data in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card network system 100 communicatively coupled to a behavioral prediction recommender system 34. Multi-party payment card network system 100 enables payment card transactions between merchants and cardholders. The behavioral prediction recommender system 34 is a system that enables merchant location data from the multi-party payment card network system to be combined with product level data from at least some of the merchant locations. The combined data is then used to provide product recommendations during a web browsing session to cardholders and/or customers based on products and merchant locations viewed and/or purchased by the cardholders and/or customers. Embodiments described herein may relate to a financial transaction card system, such as a payment card network operated by MasterCard International Incorporated. The payment card network, as described herein, is a four-party payment card network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment card network. As used herein, financial transaction data includes a unique account number associated with a cardholder using a payment card issued by an issuer, purchase data representing a purchase made by the cardholder, including a type of merchant, amount of purchase, date of purchase, and other data, which may be transmitted between any parties of multi-party payment card network system 20. Behavioral prediction recommender system 34 includes one or more special purpose processors and data structures stored in one or more memory devices communicatively coupled to the processors. Behavioral prediction recommender system 34 also includes the ability to interface with the set of proprietary communications standards promulgated by MasterCard International Incorporated for the exchange of financial transaction data. The one or more special purpose processors and data structures associated with behavioral prediction recommender system 34 may include some of the one or more special purpose processors and data structures of the one or more special purpose processors and data structures associated with MasterCard International Incorporated. In such an embodiment, behavioral prediction recommender system 34 operates using the resources of behavioral prediction recommender system 34. Alternatively, behavioral prediction recommender system 34 may also be a stand-alone or third party system communicatively coupled or assessable to payment card network system 100 where the one or more special purpose processors and data structures associated with behavioral prediction recommender system 34 may only communicate with the one or more special purpose processors and data structures of the one or more special purpose processors and data structures associated with MasterCard International Incorporated.

In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the payment card network system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card network 28 and/or issuer bank 30 stores the financial transaction data, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment card network 28, and issuer bank 30. More specifically, during and/or after the clearing process, additional data, such as a time of purchase, a merchant name, a type of merchant, purchase information, cardholder account information, a type of transaction, product or service for sale information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card network 28, and then between payment card network 28 and merchant bank 26, and then between merchant bank 26 and merchant 24.

Network 28 is configured to interface with behavioral prediction recommender system 34. Behavioral prediction recommender system 34 is configured to receive financial transaction data from payment card network 28 to generate a first matrix of merchant locations. A tally of interactions between merchant locations is used to populate the first matrix. Behavioral prediction recommender system 34 is also configured to receive product data from one of merchants 24 to generate a second matrix of product data. A tally of interactions between product data is used to populate the second matrix. Behavioral prediction recommender system 34 is further configured to generate a third matrix that combines the first matrix and the second matrix. The third matrix is used to generate weighted lists of recommended products and merchants to a cardholder and/or customers visiting a website of the merchant 24 from whom the product data was received.

Figure 2:
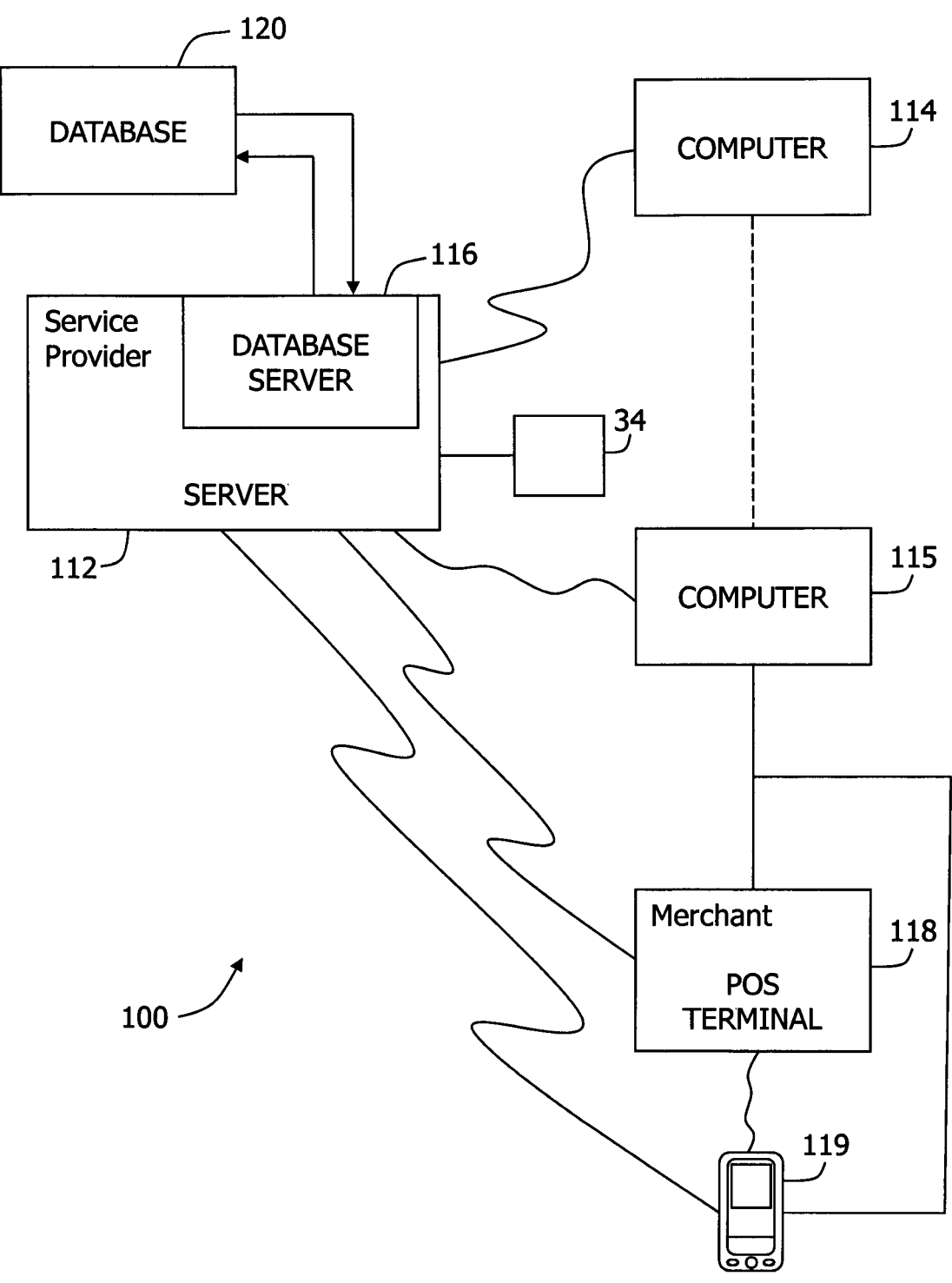

FIG. 2 is a simplified block diagram of payment card network system 100 including a plurality of computer devices including behavioral prediction recommender system 34 (shown in FIG. 1). In the example embodiment, the plurality of computer devices includes, for example, server system 112, client systems 114, and behavioral prediction recommender system 34. In one embodiment, payment card network system 100 implements a process to generate recommendations of merchant locations, products sold at each merchant locations, or combinations thereof. More specifically, behavioral prediction recommender system 34 in communication with server system 112 is configured to receive at least a portion of the financial transaction data relating to financial transactions between a plurality of merchants and cardholders. The financial transaction data includes information about the location of the merchant, and the received at least a portion of the financial transaction data is stored in a memory device.

More specifically, in the example embodiment, payment card network system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment card network system 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, a primary account number (PAN) associated with the cardholder name, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store picture files associated with the item or service for sale by the merchant user, name, price, description, shipping and delivery information, instructions for facilitating the transaction, and other information to facilitate processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with payment card network 28. In the example embodiment, server system 112 is associated with a financial transaction processing network, such as payment card network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, and/or a behavioral prediction recommender system 34. Behavioral prediction recommender system 34 may be associated with payment card network 28 or with an outside third party in a contractual relationship with payment card network 28. Accordingly, each party involved in processing transaction data are associated with a computer system shown in payment card network system 100 such that the parties can communicate with one another as described herein.

Using payment card network 28, the computers of the merchant bank or the merchant processor communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3A:
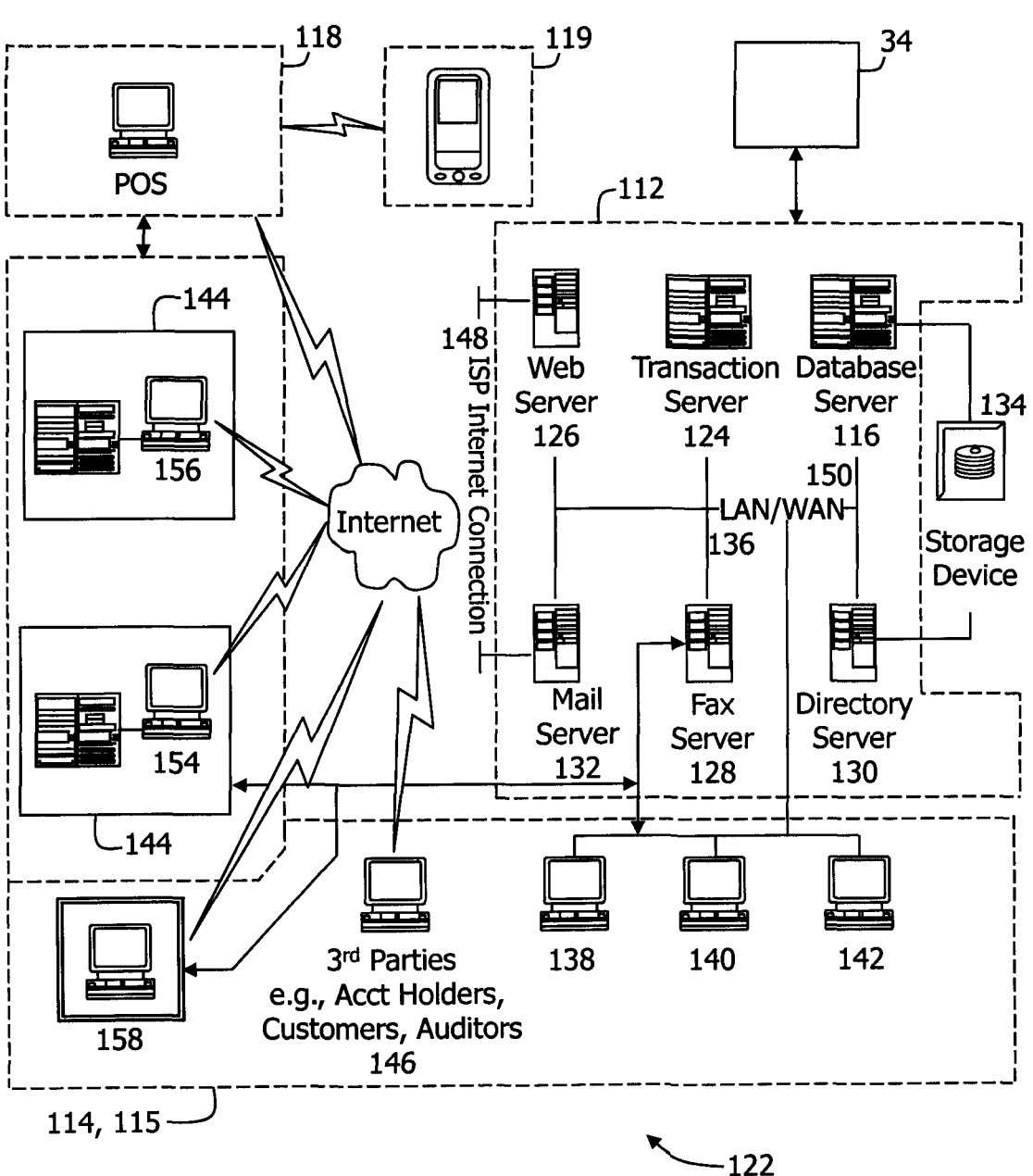
FIG. 3A is an expanded block diagram of an example embodiment of an architecture of a server system of the payment card network system shown in FIGS. 1 and 2.

FIG. 3A is an expanded block diagram of an example embodiment of an architecture of a server system 122 of payment card network system 100. Components in system 122, identical to components of payment card network system 100 (shown in FIG. 2), are identified in FIG. 3A using the same reference numerals as used in FIG. 2. For example, behavioral prediction recommender system 34 is similarly labeled in FIGS. 1, 2, and 3A. System 122 includes server system 112, client systems 114 and 115, POS terminals 118, and at least one input device 119. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to behavioral prediction recommender system 34 and various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 158 using a telephone link. Fax server 128 is configured to communicate with other client systems 138, 140, and 142 as well.

Figure 3B:
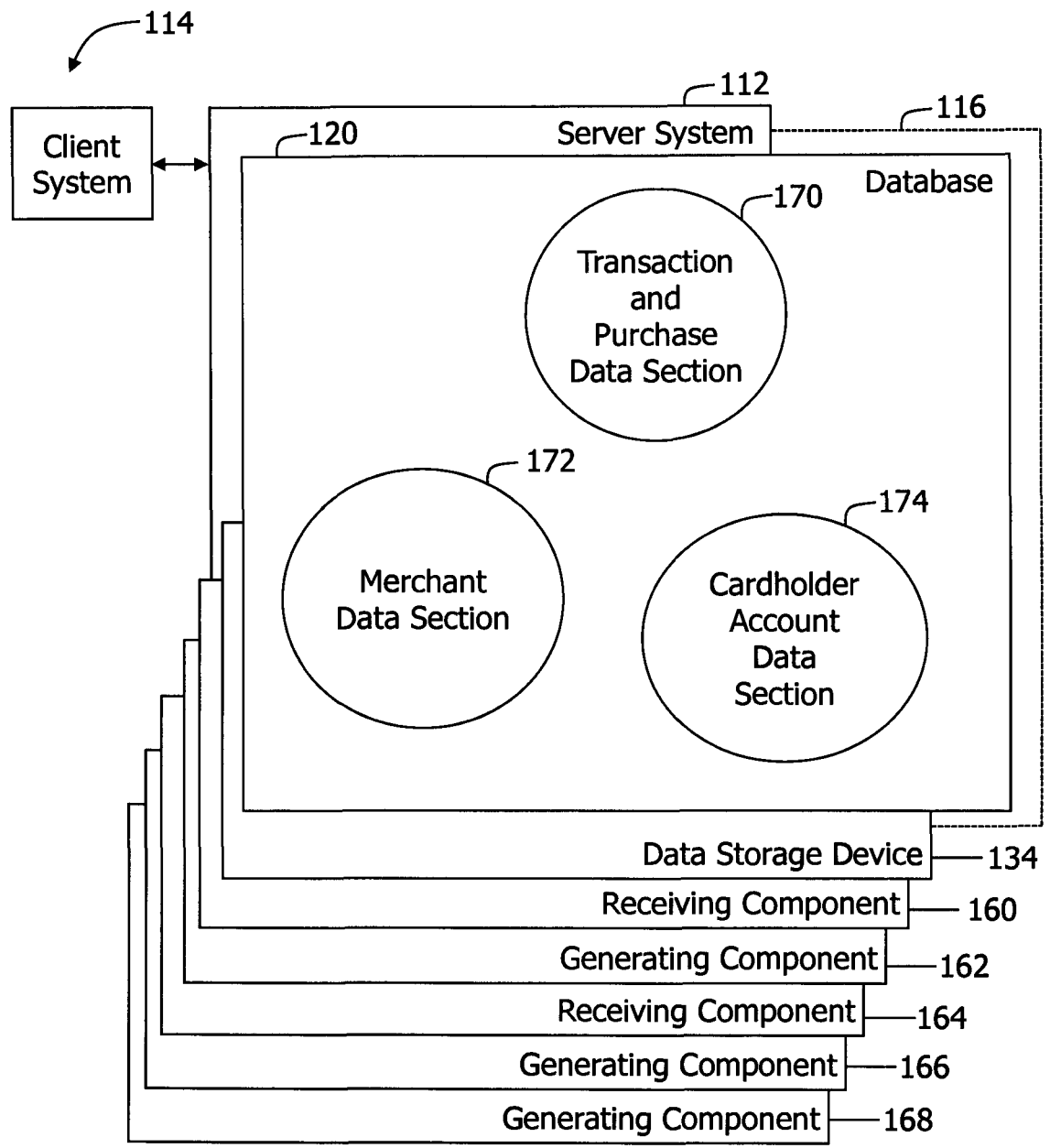
FIG. 3B shows a configuration of the database shown in FIG. 1 within the database server of the server system also shown in FIG. 1 with other related server components.

FIG. 3B shows a configuration of database 120 within database server 116 of server system 112 with other related server components. More specifically, FIG. 3B shows a configuration of database 120 in communication with database server 116 of server system 112 shown in FIGS. 2 and 3A. Database 120 is coupled to several separate components within server system 112, which perform specific tasks.

Server system 112 includes a receiving component 160 for receiving a first corpus of first data, the first data includes an indicator of an interaction between a first element of the first corpus of first data and a second element of the first corpus of first data, a generating component 162 for generating a first matrix that correlates the interactions between the first element and the second element, a receiving component 164 for receiving a second corpus of second data, the second data includes an indication of an interaction between a third element of the second corpus of second data and a fourth element of the second corpus of data, a generating component 166 for generating a second matrix that correlates the interactions between the third element and the fourth element, a generating component 168 for generating a third matrix by merging the first matrix and the second matrix using a key defined by the interactions between the first and second elements and the interactions between the third and fourth elements.

In an example embodiment, payment card network system 100 includes an administrative component (not shown) that provides an input component as well as an edit component to facilitate administrative functions. Payment card network system 100 is flexible to provide other alternative types of reports and is not constrained to the options set forth above.

In an example embodiment, database 120 is divided into a plurality of sections, including but not limited to, a Transaction and Purchase Data Section 170, a Merchant Data Section 172, and a Cardholder Account Data Section 174. These sections within database 120 are interconnected to update and retrieve the information as required.

Figure 4:
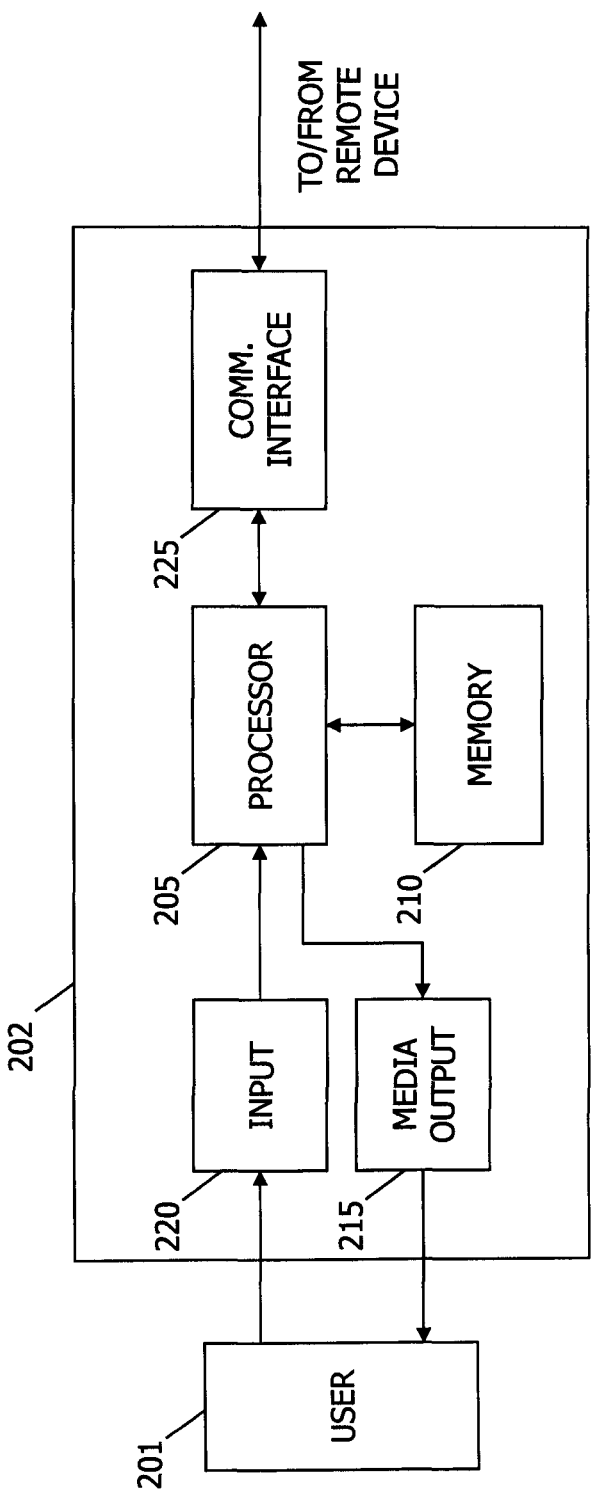

FIG. 4 illustrates an example configuration of a user system 202 (shown in FIG. 2) and operated by a user 201, such as cardholder 22 (shown in FIG. 1). User system 202 may include, but is not limited to, client systems 114, 115, 138, 140, 142, 144, 146, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or other data to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, 4G or Bluetooth or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
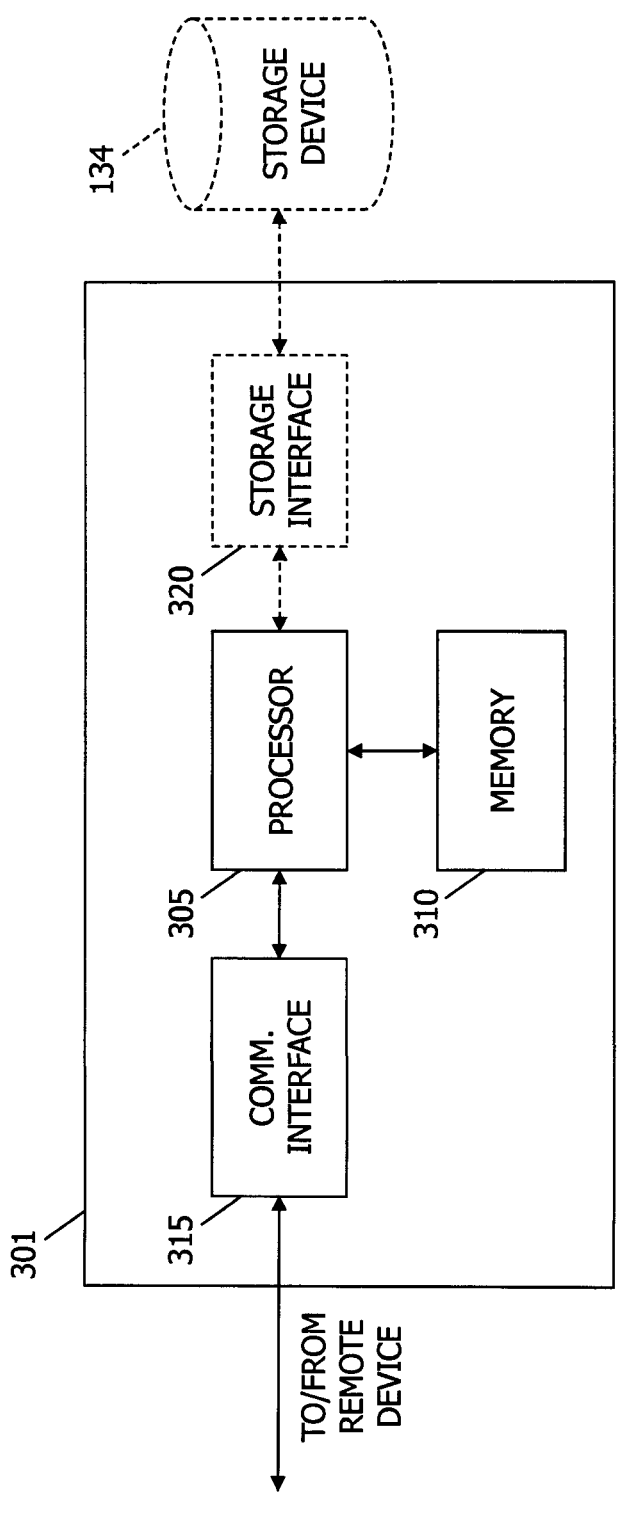

FIG. 5 illustrates an example configuration of a server system 301 such as server system 112 (shown in FIGS. 2, 3A, and 3B). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2, 3A, and 3B.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

FIG. 6 is flow chart of an example method 600 of merging heterogeneous data types. In the example embodiment, method 600 is implemented using a computer device coupled to a memory device. Method 600 includes receiving 602 a first corpus of first data, the first data includes an indicator of an interaction between a first element of the first corpus of first data and a second element of the first corpus of first data, receiving 604 a second corpus of second data, the second data includes an indication of an interaction between a third element of the second corpus of second data and a fourth element of the second corpus of data, and generating 606 a third matrix using correlations of the first and second elements with correlations of the third and fourth elements.

Figure 7:
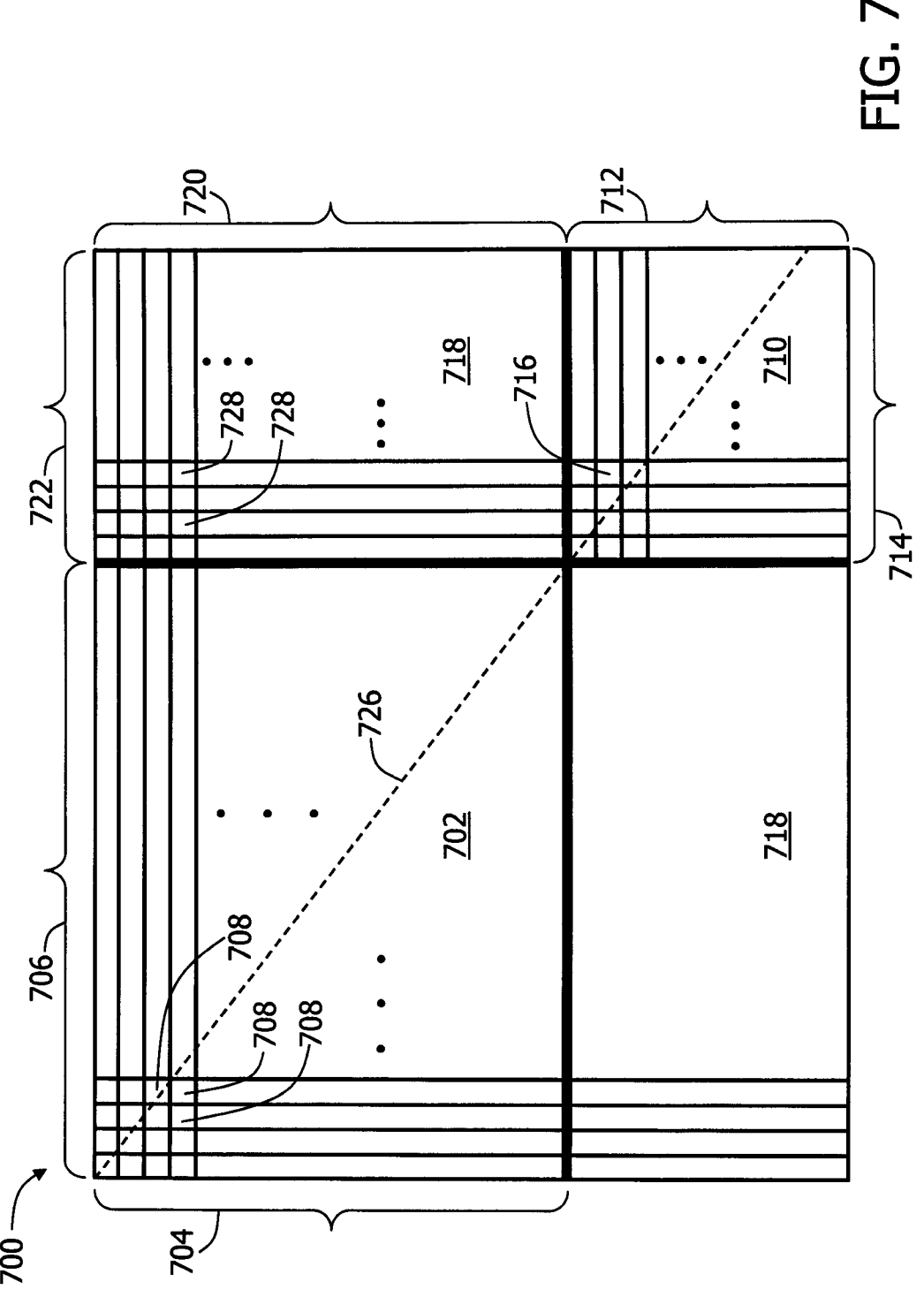

FIG. 7 is a diagram of a correspondence matrix 700 generated by behavioral prediction recommender system 34 (shown in FIG. 1) in accordance with the example embodiment of the present disclosure. In the example embodiment, a first matrix 702 includes a plurality of rows 704 and columns 706, the intersection of each forms a cell 708. Each row represents a merchant location ordered in a predetermined order and each column also represents a merchant location in the same order or a different predetermined order. Each cell 708 represents a number of interactions between each merchant location that intersects at that cell 708. An interaction typically represents a financial transaction by a cardholder that takes place at both merchant locations that make up the intersection. For example, a cardholder that shops at a first store typically has a tendency to shop at a complementary second store and the number of interactions that would be tallied as co-visits to those two stores would be relatively high. For example, the first store and second store may be located geographically near each other making visits to both stores convenient for the cardholder. Other stores would typically have different tallies of co-visits with the first store. Therefore, the tallies of co-visits for each store can be weighted according to their total co-visits. Such a weighted list can be used to recommend another merchant location to a cardholder that has expressed an interest in the first merchant location, such as, by browsing a web site associated with the first store.

A second matrix 710 includes a plurality of rows 712 and columns 714, the intersection of each forms a cell 716. Each row 712 represents product data of a selectable merchant location ordered in a predetermined order and each column 714 also represents product data of a selectable merchant location in the same order or a different predetermined order. Each cell 716 represents a number of interactions between each product data that intersects at that cell 716. In this case, an interaction typically represents two products that are purchased at a merchant location. A value in each cell indicates a tally of the instances when the products represented by the row and column are purchased together.

A third matrix 718 includes a plurality of rows 720 and columns 722, the intersection of each forms a cell 728. Third matrix 718 is mirrored about a diagonal axis 726 of correspondence matrix 700 due to the construction of matrices 702, 710, and 718. Third matrix 718 is formed by extending rows 704 and columns 706 of first matrix 702 by rows 712 and columns 714 of second matrix 710. The combination of first matrix 702 and second matrix 710 is formed using a key defined by the interactions between the first and second elements (defined by rows 704 and columns 706) and the interactions between the third and fourth elements (defined by rows 712 and columns 714) includes generating the third matrix using at least one of an exact key, an overlapping key, and a non-overlapping key. Each row 720 represents product data at the merchant locations and each column 722 represents product data at the merchant locations. Each cell 728 represents a number of interactions between each product data at the merchant locations that intersects at that cell 728. In this case, an interaction typically represents two products that are purchased at the same or different merchant locations. A value in each cell indicates a tally of the instances when the products are purchased at merchant locations represented by the row and column are purchased together. For example, an online retailer or merchant may have merchant partners that sell the same products as the online retailer. The merchant and online retailer may be partners in the sense that including the merchant's products on the retailers website increases sales of the merchants products while the online retailer receives a fee for hosting the product on its website. Using third matrix 718, online retailer may recommend, to a cardholder browsing its website, a product that the online retailer also sells. This may not affect the revenue of the online retailer because the fee charged to the merchant may offset the lost net revenue of not making the sale itself. Thus, making a recommendation to a cardholder of a product sold by a different merchant location may improve a cardholder's level of satisfaction with the transaction and the standing of the online retailer in the eyes of the cardholder.

In various embodiments, the merge of the networks is defined based on the available "key," of which there are for example, three types: (1) an Exact Key where the financial transaction data includes a personal account number (PAN), a merchant code (MCC), a date/time of the transaction, and an amount of the transaction; (2) an Overlapping/Approximate Key that includes the MCC, date/time of the transaction, and an amount of the transaction; and (3) a Non- Overlapping Key that includes a proprietary customer identifier with no tie in to the financial transaction data.

The exact key is available when customers have "opted in" as cardholders. Typically, customers who opt-in do so to permit personalized information to be returned to them. This opt-in also permits generation of third matrix 718 by behavioral prediction recommender system 34. Once third matrix 718 is formed, the keys are no longer used. If a specific cardholder is to be targeted with a personalized offer, their vector of past purchases can be applied to third matrix 718 to generate specific recommendations. The uploaded merchant data can then be matched precisely based on a key like the example above. One-to-one personalization by leveraging the data within and across networks can be achieved using a recommender. Other traditional modeling and segmentation techniques can be applied with the cardholder as a member of a segment. Also note that a customer of a participating merchant does not have to opt in to receive recommendations if that merchant passes along a product vector (of past purchases, or items in a cart, etc.).

The overlapping/approximate key is available in cases where merchants may not have a large opt-in customer base, so the merge is performed using an approximate key (without a PAN). Microsegment targeting is possible with an approximate match, where a microsegment may have fewer than tens of members. The third matrix is still able to be populated approximately.

The non-overlapping key is available when the proprietary customer identifier used in the key has no tie in to the financial transaction data. In some cases, some merchants may wish to only populate the second matrix of the correspondence matrix using their own proprietary product identifier, thus allowing one-to-one personalization of existing customers independent of the financial transaction data. This allows merchants to enable one-to-one personalization of only their product space. It also enables the use of non-financial transaction data transactions.

In a specific example for the exact key scenario, if a customer used a payment card to buy a camping stove (corresponding to a specific column of third matrix 718), then every merchant where the payment card was used (in a given time window) would receive an incremental bump in the interactions tallied in each of the cells along that column. With enough other customers also using their payment cards, the more meaningful interactions would accumulate greater value and start to stand out. For example, interactions between the camping stove product and staying a KOA campgrounds would typically accumulate greater tallies than interactions between the camping stove product and making a purchase at, for example, Starbucks. There would be customers who purchase a camping stove and also make a purchase at Starbuck's, but over time, with more customer transactions being evaluated, the interactions of customers who purchase a camping stove and also stay at a KOA campground would overwhelm the interactions of the customers who purchase a camping stove and also made a purchase at Starbuck's. This difference is used by a recommender system to provide more reliable recommendations.

In an example of a partially overlapping key the merchant transmits a batch of transactions for the camping stove column of third matrix 718 to behavioral prediction recommender system 34 or the batch of transaction are made accessible to behavioral prediction recommender system 34:

TABLE 1

| Column Number | Date Time | Amount | Location |
|---|---|---|---|
| 888 | 201507021159 | $172.64 | 452 |
| 888 | 201507020913 | $36.59 | 452 |
| 888 | 201507030834 | $65.22 | 371 |

Behavioral prediction recommender system 34 locates PANs that match the transactions transmitted and reinforces the merchants that have seen all matching PANs in the give timeframe by incrementing the value in the cell at the intersection of the merchant and the camp stove. For example, two different cardholders may have come in to store #452 on July $2^{nd}$ at 9:13 AM and bought the same camping stove (as their only item) and match on row two above. In some cases, a perfect match cannot be assured and likely matches are then incremented. Valuable information is still captured in the tallies of the interactions, even with this imperfect data.

Another cross example between "products" and "merchants" is "staying in a room at Castle XYZ," which is a product that a travel-oriented merchant may offer. In this case the merchant may be a broker or intermediary that takes payment and arranges for the accommodations. Such an arrangement makes the transactions look like they are occurring at the same location, for example, a headquarters location of the merchant rather than the actual location of the accommodation. So the uploaded data for several visitors to that castle might look like:

TABLE 2

| Column Number | Date Time | Amount | Location |
|---|---|---|---|
| 222 | 201507021159 | $150.37 | 452 |
| 222 | 201507120913 | $300.01 | 452 |
| 222 | 201506290834 | $450.89 | 452 |

Because the merchant is a broker and maybe an online only entity, their location would always be the same, and the actual location of the accommodation would be unknown unless the merchant also provides that information. Also note that in the overlapping key scenario, it's possible that multiple transactions could match on a given day if the multiple transactions had the same checkout date and amount.

Figure 8:
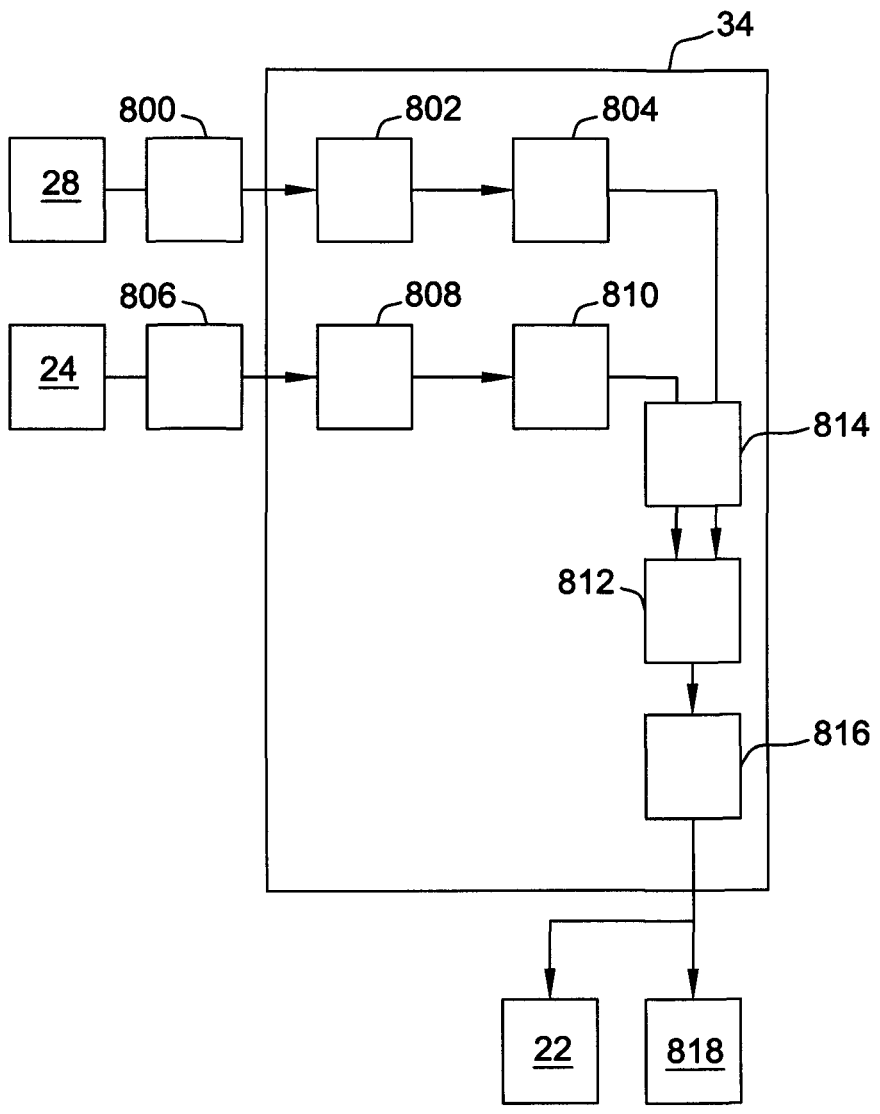

FIG. 8 is a schematic block diagram of behavioral prediction recommender system 34 in accordance with an example embodiment of the present disclosure. In the example embodiment, behavioral prediction recommender system 34 is configured to interface with payment card network 28 to receive financial transaction data 800. A first matrix generator 802 is configured to generate a first matrix 804 of merchant locations. A tally of interactions between merchant locations is used to populate the first matrix. The interactions between merchant locations is determined from financial transaction data 800 by first matrix generator 802. Behavioral prediction recommender system 34 is also configured to receive product data 806 from one or more of merchants 24. A second matrix generator 808 is configured to generate a second matrix 810 of product data. A tally of interactions between product data is used to populate second matrix 810. Behavioral prediction recommender system 34 is further configured to generate a third matrix 812 using a matrix calculator 814 that combines the first matrix and the second matrix. Third matrix 812 is used by a list generator 816 to generate weighted lists of recommended products and merchants to a cardholder 22 and/or customers 818 visiting a website of merchant 24 from whom product data 806 was received.

Figure 9:
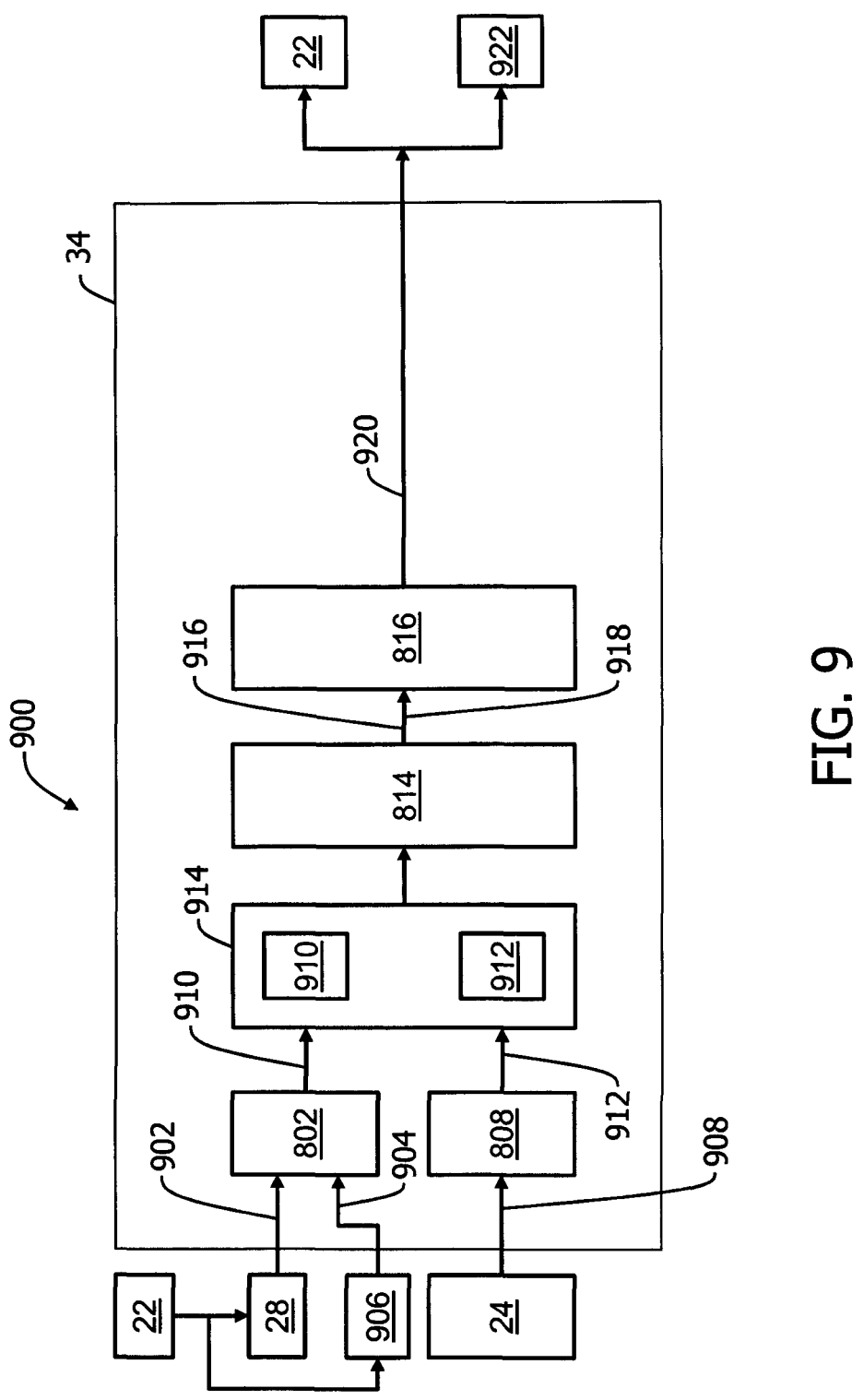

FIG. 9 is a data flow diagram 900 of behavioral prediction recommender system 34 in accordance with an example embodiment of the present disclosure. In the example embodiment, behavioral prediction recommender system 34 includes at least first matrix generator 802, second matrix generator 808, matrix calculator 814, and list generator 816. First matrix generator 802 is configured to receive financial transaction data 902 relating to purchases made by a plurality of cardholders 22 using payment card network system 100. First matrix generator 802 is configured to receive other cardholder interactions 904 relating to one or more merchants non-payment card network venues 906, such as, via a website, social media, telecommunications, and the like. Second matrix generator 808 is configured to receive product data 908 relating to products purchased by a plurality of cardholders 22 using payment card network system 100. First and second matrix generators 802, 808 are configured to generate respective first matrix 910 and second matrix 912. First matrix 910 and second matrix 912 may be stored in a particular database 914 configured to improve a performance of processors, for example, processors 205, 305 by processing the huge size of first matrix 910 and second matrix 912 and temporary calculation results generated when organizing or combining first matrix 910 and second matrix 912. First matrix 910 and second matrix 912 may be segregated in database 914 or may be commingled in database 914 according to a particular algorithm executing. First matrix 910 and second matrix 912 may be combined by matrix calculator 814 to form a third matrix 916. Because matrix calculator 814 is capable of combining first matrix 910 and second matrix 912 in a plurality of ways, third matrix 916 can be of many different forms. A list generator 816 is configured to receive third matrix 916 or any number of additional matrices generated by list calculator 814, such as, but not limited to, a fourth matrix 918 and to generate weighted lists 920 of predictions of recommended merchants and/or products that are output to cardholder 22 or other user, such as, a requester 922.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) receiving a first corpus of first data, the first data includes an indicator of an interaction between a first element of the first corpus of first data and a second element of the first corpus of first data; (b) generating a first matrix that correlates the interactions between the first element and the second element; (c) receiving a second corpus of second data, the second data includes an indication of an interaction between a third element of the second corpus of second data and a fourth element of the second corpus of second data; (d) generating a second matrix that correlates the interactions between the third element and the fourth element; and (e) generating a third matrix by merging the first matrix and the second matrix using a key defined by the interactions between the first and second elements and the interactions between the third and fourth elements.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer system for predicting outcomes, the computer system in communication with a user computing device and a server system via a computer network, the computer system comprising: a first matrix generator; a second matrix generator; a matrix calculator; a list generator; and at least one processor in communication with at least one database, the at least one processor configured to:

receive, at the first matrix generator from a server system, a first corpus of first data including a first set of data elements including at least transaction data associated with a first plurality of transactions initiated by a first plurality of users, and a second set of data elements including at least an identification of a plurality of merchants where the first plurality of transactions were initiated;

generate, using the first matrix generator and the first corpus of first data, a first matrix within the at least one database, the first matrix being a data structure stored within the at least one database;

determine, using the first matrix generator, a degree of interaction between each merchant of the plurality of merchants based on the first set of data elements, wherein an interaction between each merchant of the plurality of merchants is determined by correlating transactions initiated by a user of the first plurality of users at two or more merchants of the plurality of merchants;

receive, at the second matrix generator from the server system, a second corpus of second data including a third set of data elements including at least second transaction data associated with a second plurality of transactions initiated by a second plurality of users, and a fourth set of data elements including at least an identification of a plurality of items associated with the second plurality of transactions;

generate, using the second matrix generator and the second corpus of second data, a second matrix within the at least one database, the second matrix being another data structure stored within the at least one database;

determine, using the second matrix generator, a degree of interaction between each item of the plurality of items based on the third set of data elements, wherein an interaction between each item of the plurality of items is determined by correlating two or more items of the plurality of items with second transactions initiated by a user of the second plurality of users, wherein the correlated second transactions include each of the two or more items;

combine, using the matrix calculator and a key common to the first matrix and the second matrix, the first matrix and the second matrix to generate a third matrix within the at least one database, the third matrix being an additional data structure including a plurality of data cells, each of the plurality of data cells including a value and being an intersection between one of the first and second set of data elements and one of the third and fourth set of data elements;

update, in near real-time and using additional transaction data received from the server system and without using the key, the third matrix separate from the first database and the second database, within the at least one database with respect to receipt of the additional transaction data, wherein updating the third matrix separate from the first database and the second database improves the performance of the at least one processor by processing the large size of the first matrix and the second matrix separate from the third matrix and allowing the third matrix to be updated in near real-time;

in response to updating the third matrix, generate, in near real-time and using the list generator and the updated third matrix, a list including one or more predictions for a user of one of the first or second plurality of users, the one or more predictions associated with an item of the plurality of items of a merchant of the one or more of the plurality of merchants at a location of the merchant having the item; and cause display, on a user interface of the user computing device via one of an online website and a client application in communication with the computer network, the one or more predictions.

2. The computer system of claim 1, wherein the at least one processor is further configured to:

receive, at the first matrix generator, interaction data; and generate, using the first matrix generator and the interaction data, the first matrix within the at least one database.

3. The computer system of claim 1, wherein the first matrix comprises two dimensions, wherein a first of the two dimensions is an ordered listing of the first set of data elements and a second of the two dimensions is the same ordered listing of the first set of data elements, wherein a value of each cell of the first matrix represents a count of instances in the transaction data in which a same account identifier was used at two of the plurality of merchants that intersect at a respective cell of the first matrix.

4. The computer system of claim 1, wherein the second matrix comprises two dimensions, wherein a first of the two dimensions is an ordered listing of the second set of data elements and a second of the two dimensions is the same ordered listing of the second set of data elements, wherein a value of each cell of the second matrix represents a count of transactions of the second plurality of transactions that include two of the plurality of items that intersect at a respective cell of the second matrix.

5. The computer system of claim 1, wherein the third matrix comprises a first dimension corresponding to an ordered listing of the first set of data elements and a second dimension corresponding to an ordered listing of the second set of data elements.

6. The computer system of claim 1, wherein the at least one processor is further configured to generate, for each of the second plurality of transactions, the third matrix by:
  identifying at least one account identifier corresponding to the key for a respective transaction;
  identifying, for the first plurality of transactions, each merchant identifier associated with the identified at least one account identifier; and
  incrementing, for each of the plurality of items in the respective transaction, the value of the cell in the third matrix at which each item and the identified merchant identifier intersect.

7. The computer system of claim 1, wherein the additional transaction data associated with a third plurality of transactions initiated by a third plurality of users, and wherein the at least one processor is further configured to:
  receive the additional transaction data from the server system; and
  update by incrementing, using the additional transaction data, the value within one or more cells of the third matrix.

8. The computer system of claim 1, wherein the one or more predictions include at least one of a first recommendation to make a purchase at the one or more merchants or a second recommendation to purchase the one or more items.

9. A computer-implemented method implemented by a computer for predicting outcomes, the computer system in communication with a user computing device and a server system via a computer network, the computer system including a first matrix generator, a second matrix generator, a matrix calculator, a list generator, and at least one processor in communication with at least one database, the method comprising:
  receiving, at the first matrix generator from a server system, a first corpus of first data including a first set of data elements including at least transaction data associated with a first plurality of transactions initiated by a first plurality of users, and a second set of data elements including at least an identification of a plurality of merchants where the first plurality of transactions were initiated;
  generating, using the first matrix generator and the first corpus of first data, a first matrix within the at least one database, the first matrix being a data structure stored within the at least one database;
  determining, using the first matrix generator, a degree of interaction between each merchant of the plurality of merchants based on the first set of data elements, wherein an interaction between each merchant of the plurality of merchants is determined by correlating transactions initiated by a user of the first plurality of users at two or more merchants of the plurality of merchants;

receiving, at the second matrix generator from the server system, a second corpus of second data including a third set of data elements including at least second transaction data associated with a second plurality of transactions initiated by a second plurality of users, and a fourth set of data elements including at least an identification of a plurality of items associated with the second plurality of transactions;
  generating, using the second matrix generator and the second corpus of second data, a second matrix within the at least one database, the second matrix being another data structure stored within the at least one database;
  determining, using the second matrix generator, a degree of interaction between each item of the plurality of items based on the third set of data elements, wherein an interaction between each item and the plurality of items is determined by correlating two or more items of the plurality of items with second transactions initiated by a user of the second plurality of users, wherein the correlated second transactions include each of the two or more items;
  combining, using the matrix calculator and a key common to the first matrix and the second matrix, the first matrix and the second matrix to generate a third matrix within the at least one database, the third matrix being an additional data structure including a plurality of data cells, each of the plurality of data cells including a value and being an intersection between one of the first and second set of data elements and one of the third and fourth set of data elements;
  updating, in near real-time and using additional transaction data received from the server system and without using the key, the third matrix separate from the first database and the second database, within the at least one database with respect to receipt of the additional transaction data, wherein updating the third matrix separate from the first database and the second database improves the performance of the at least one processor by processing the large size of the first matrix and the second matrix separate from the third matrix and allowing the third matrix to be updated in near real-time;
  in response to updating the third matrix, generating, in near real-time and using the list generator and the updated third matrix, a list including one or more predictions for a user of one of the first or second plurality of users, the one or more predictions associated with—an item of the plurality of items of a merchant of the one or more of the plurality of merchants—at a location of the merchant having the item; and
  causing display, on a user interface of the user computing device via one of an online web site and a client application in communication with the computer network, the one or more predictions.

10. The computer-implemented method of claim 9 further comprising:
  receiving, at the first matrix generator, interaction data; and
  generating, using the first matrix generator and the interaction data, the first matrix within the at least one database.

11. The computer-implemented method of claim 9, wherein the first matrix comprises two dimensions, wherein a first of the two dimensions is an ordered listing of the first set of data elements and a second of the two dimensions is the same ordered listing of the first set of data elements, wherein a value of each cell of the first matrix represents a count of instances in the transaction data in which a same account identifier was used at two of the plurality of merchants that intersect at a respective cell of the first matrix.

12. The computer-implemented method of claim 9, wherein the second matrix comprises two dimensions, wherein a first of the two dimensions is an ordered listing of the second set of data elements and a second of the two dimensions is the same ordered listing of the second set of data elements, wherein a value of each cell of the second matrix represents a count of transactions of the second plurality of transactions that include two of the plurality of items that intersect at a respective cell of the second matrix.

13. The computer-implemented method of claim 9, wherein the third matrix comprises a first dimension corresponding to an ordered listing of the first set of data elements and a second dimension corresponding to an ordered listing of the second set of data elements.

14. The computer-implemented method of claim 9 further comprising generating, for each of the second plurality of transactions, the third matrix by:

identifying at least one account identifier corresponding to the key for a respective transaction;

identifying, for the first plurality of transactions, each merchant identifier associated with the identified at least one account identifier; and incrementing, for each of the plurality of items in the respective transaction, the value of the cell in the third matrix at which each item and the identified merchant identifier intersect.

15. The computer-implemented method of claim 9, wherein the additional transaction data associated with a third plurality of transactions initiated by a third plurality of users, and wherein the method further comprises:

receiving the additional transaction data from the server system; and updating by incrementing, using the additional transaction data, the value within one or more cells of the third matrix.

16. The computer-implemented method of claim 9, wherein the one or more predictions include at least one of a first recommendation to make a purchase at the one or more merchants or a second recommendation to purchase the one or more items.

17. At least one non-transitory computer-readable storage medium having computer-executable instructions embodied thereon, wherein when executed by at least one processor of a computer system for predicting outcomes, the computer system in communication with a user computing device and a server system via a computer network, the computer system including a first matrix generator, a second matrix generator, a matrix calculator, and a list generator, the at least one processor in communication with at least one database, the computer-executable instructions cause the at least one processor to:

receive, at the first matrix generator from a server system, a first corpus of first data including a first set of data elements including at least transaction data associated with a first plurality of transactions initiated by a first plurality of users, and a second set of data elements including at least an identification of a plurality of merchants where the first plurality of transactions were initiated;

generate, using the first matrix generator and first corpus of first data, a first matrix within the at least one database, the first matrix being a data structure stored within the at least one database;

generate, using the first matrix generator, a degree of interaction between each merchant of the plurality of merchants based on the first set of data elements, wherein an interaction between each merchant of the plurality of merchants is determined by correlating transactions initiated by a user of the first plurality of users at two or more merchants of the plurality of merchants;

receive, at the second matrix generator from the server system, a second corpus of second data including a third set of data elements including at least second transaction data associated with a second plurality of transactions initiated by a second plurality of users, and a fourth set of data elements including at least an identification of a plurality of items associated with the second plurality of transactions;

generate, using the second matrix generator and the second corpus of second data, a second matrix within the at least one database, the second matrix being another data structure stored within the at least one database;

determine, using the second matrix generator, a degree of interaction between each item of the plurality of items based on the third set of data elements, wherein an interaction between each item of the plurality of items is determined by correlating two or more items of the plurality of items with second transactions initiated by a user of the second plurality of users, wherein the correlated second transactions include each of the two or more items;

combine, using the matrix calculator and a key common to the first matrix and the second matrix, the first matrix and the second matrix to generate a third matrix within the at least one database, the third matrix being an additional data structure including a plurality of data cells, each of the plurality of data cells including a value and being an intersection between one of the first and second set of data elements and one of the third and fourth set of data elements;

update, in near real-time and using additional transaction data received from the server system and without using the key, the third matrix separate from the first database and the second database, within the at least one database with respect to receipt of the additional transaction data, wherein updating the third matrix separate from the first database and the second database improves the performance of the at least one processor by processing the large size of the first matrix and the second matrix separate from the third matrix and allowing the third matrix to be updated in near real-time;

in response to updating the third matrix, generate, in near real-time and using the list generator and the third matrix, a list including one or more predictions for a user of one of the first or second plurality of users, the one or more predictions associated with an item of the plurality of items of a merchant of the one or more of the plurality of merchants at a location of the merchant having the item; and cause display, on a user interface of the user computing device via one of an online web site and a client application in communication with the computer network, the one or more predictions.

18. The at least one non-transitory computer-readable storage medium of claim 17, wherein the computer-executable instructions further cause the at least one processor to:

receive, at the first matrix generator, interaction data; and generate, using the first matrix generator and the interaction data, the first matrix within the at least one database.

19. The at least one non-transitory computer-readable storage medium of claim 17, wherein the computer-executable instructions further cause the at least one processor to generate, for each of the second plurality of transactions, the third matrix by:

identifying at least one account identifier corresponding to the key for a respective transaction;

identifying, for the first plurality of transactions, each merchant identifier associated with the identified at least one account identifier; and incrementing, for each of the plurality of items in the respective transaction, the value of the cell in the third matrix at which each item and the identified merchant identifier intersect.

20. The at least one non-transitory computer-readable storage medium of claim 17, wherein the additional transaction data associated with a third plurality of transactions initiated by a third plurality of users, and wherein the computer-executable instructions further cause the at least one processor to:

receive the additional transaction data from the server system; and update, using the additional transaction data, the third matrix by incrementing, using the additional transaction data, the value within one or more cells of the third matrix.

\* \* \* \* \*